United States Patent [19]

Regueiro

[11] Patent Number: 5,778,849
[45] Date of Patent: Jul. 14, 1998

[54] INSULATED PRECOMBUSTION CHAMBER

[75] Inventor: Jose F. Regueiro, Rochester Hills, Mich.

[73] Assignee: Chrysler Corporation, Auburn Hills, Mich.

[21] Appl. No.: 851,301

[22] Filed: May 5, 1997

[51] Int. Cl.$^6$ ........................................ F02F 1/00
[52] U.S. Cl. ........................................ 123/254
[58] Field of Search ........................ 123/254, 262, 123/293, 269, 263, 90.27, 271

[56] References Cited

U.S. PATENT DOCUMENTS

| | | | |
|---|---|---|---|
| 4,513,708 | 4/1985 | Latsch et al. | 123/263 |
| 5,014,664 | 5/1991 | Matsuoka | 123/271 |
| 5,392,744 | 2/1995 | Regueiro | 123/262 |
| 5,454,356 | 10/1995 | Kawamura | 123/254 |
| 5,520,148 | 5/1996 | Kawamura et al. | 123/254 |
| 5,570,665 | 11/1996 | Regueiro | 123/90.27 |

OTHER PUBLICATIONS

960015 *Design and Development of Three Combustion Systems for a Small Passenger-Car Diesel Engine*, Vladimir Kosina, Jose F. Regueiro, pp. 1–18.

*Combustion and Combustion Chamber for a Low Heat Rejection Engine*, H. Kawamura, A. Higashino, S. Sekiyama, pp. 1–9.

960058 *Rotular Tappet™ Valve Trains for Hemispherical Combustion Chambers*, Jose F. Regueiro, Vladimir Kosina, pp. 1–16.

*Primary Examiner*—Raymond A. Nelli
*Attorney, Agent, or Firm*—Kenneth H. MacLean

[57] ABSTRACT

An insulated pre-combustion chamber of an internal combustion engine in which a piston is disposed in a cylinder for reciprocal movement relative to the cylinder. A cylinder head is provided over the cylinder and piston to form a main combustion chamber and the pre-combustion chamber is located in the cylinder head above the main combustion chamber. The pre-combustion chamber includes a pair of housing members and a retainer member all rigidly interconnected so as to provide an annular cavity between the retainer member and the upper housing member. Transfer passages are formed in the lower housing member for connecting the pre-combustion chamber with the main combustion chamber, and the cavity serves as an insulation area which cooperates with a separate and independent insulation member located between the lower housing member and the cylinder head for reducing the heat loss from the pre-combustion chamber.

20 Claims, 6 Drawing Sheets

INSULATED PRECOMBUSTION CHAMBER

This invention is disclosed in and based upon Provisional patent application Ser. No. 60/038,265 filed on Feb. 4, 1997 and entitled "INSULATED PRECOMBUSTION CHAMBER".

FIELD OF THE INVENTION

This invention concerns internal combustion engines and more particularly relates to a pre-combustion chamber that is insulated so as to reduce the heat loss therefrom during the operation of the engine.

BACKGROUND OF THE INVENTION

Two fundamentally different combustion systems are used today for diesel engines. One is the open-chamber or direct injection (DI) system and the other is the divided chamber or indirect injection system (IDI). In the DI system, high-pressure fuel (delivered by fuel injectors) is injected at the end of the compression stroke directly into the combustion chamber formed on the top of the piston. On the other hand, in the divided-chamber IDI combustion system, all the fuel is injected in a "pre-combustion" chamber or small cell that is in constant communication with the main combustion chamber. The cell contains only a fraction of the compressed air charge at firing time and, as a consequence, only part of the fuel injected burns in it. Subsequent to ignition, the resulting combustion drives the products of combustion and excess fuel through the transfer passage(s) into the main chamber with great energy in the form of temperature and velocity. Combustion is quickly completed in the main chamber with the aid of a high degree of turbulence.

During the last twenty-five years, great efforts have been directed with some degree of success towards applying the DI system to smaller passenger-car high-speed diesel engines. The DI combustion process, however, while currently being the optimum for larger truck diesel engines, suffers from various major technical difficulties in its applications to smaller, higher-speed passenger-car applications. The variable speed operation typical of passenger-car service, is one of the problems that is greatly aggravated by the fact that the engines must operate under strict emission-control regulations throughout a far-wider speed and load range. Although a handful of two-valve DI engines are in production for smaller vehicles, only one is in production for automobiles, namely, the 1.9 liter, four-cylinder, Volkswagen Golf and Jetta, TDI-series and its larger six cylinder brethren. The others are used in Europe for delivery vans and Sport Utility Vehicles.

The bulk of present research relative to small, high-speed automotive diesel engines is being conducted with four-valve systems and a centrally located fuel injector. Because of their small size, the new injection systems proposed for these small engines cannot generate the high pressures (up to 30,000 psi) of their larger diesel engine used for trucks. Even if it could generate the high pressures, it could not be used because the high pressures entail unacceptably small nozzle discharge orifices prone to coking. In view of the limited possibilities with the injection system and in order to increase the mixing at the low engine speeds, a solution has been attempted by feeding each of the two intake valves via a different port, one directed and the other one helical. By de-activating the directed port at low engine speed, all the air enters through the helical port and generates maximum swirl, to improve the low-speed mixing and combustion. Then, for high-speed, both ports open for maximum air-flow and reduced swirl, more optimum to high-speed. This approach is not only expensive, but suffers because the swirl port always tends to reduce the air flow, so that, when both are open for high speed, the total flow is less than if both ports were of the directed type such as used with IDI engines. Moreover, these swirl-control systems are not either "on" or "off" and therefore continuously variable. As a result, although they satisfactorily improve combustion conditions on both the high-speed ranges and low-speed ranges, they do not do so in an optimized fashion throughout the total speed range. Generally, then, it could be said that the control logic, if anything, suffers a net loss.

In addition, small diesel engines show other problems which are mostly caused by the difficulties of properly combusting the fuel in the small chambers. These problems are explained in great detail in my Technical Papers Series 960058 and Series 960015, both presented on Feb. 26, 1996 at the SAE International Congress and Exposition, Detroit, Mich. The emissions problems are the worst, especially oxides of nitrogen ($NO_x$), but also hydrocarbons, particulates, smoke and noise. All of these, as well as the power and fuel consumption, suffer greatly both by the very large proportion of inactive volumes distributed throughout the chamber in the form of crevices and by the sheer physical impossibility of properly timing the valve events without further increasing the crevice (inactive) volumes. The $NO_x$ problem, as on all engines, is a direct-function of the efficiency of the combustion process, which has already been characterized as high. The hydrocarbon, particulate and smoke problems are related to the quality of the mixing, the small size of the chamber, and the short real-time available to complete the combustion process. The problems also derive from the quality of injection; especially influenced by the so-called tail-ends of the injection process, but also affected by the physical impossibility of using the very high pressures of the larger truck engines. The problem with injection tail-ends is that the droplet size increases uncontrollably after the injection-end signal is produced at the pump and the high-pressure fuel, trapped in the line-volume between the point where the signal is generated and the tip discharge holes, must be relieved through the discharge holes during a process of decaying-pressure. Complete combustion of this last fed portion of the injected fuel is impossible because (1) the fuel enters the chamber late during the combustion process when the amount of free-oxygen present has already been reduced by the prior combustion of the preceding main-fuel charge, and (2) the fuel is in the form of large droplets with low velocity that do not mix well and that do not have the time to evaporate and burn so late in the cycle. As a consequence, the fuel is not burnt and is exhausted as hydrocarbons, particulate and smoke. The smoke-limit, which controls the maximum power output, is reached at relatively high air-fuel ratios close to 25:1. In other words, the combustion process does not utilize all the air trapped in the chamber.

An additional problem with the DI combustion system is that of noise. The sudden and almost instantaneous ignition of a large volume of fuel in the main chamber results in a hammer-like high rate of pressure-rise (dubbed diesel-knock) which, apart from its chemical noise, resounds through the piston-rod and crank mechanisms plus the engine block and cylinder head, exciting them all into high-frequency mechanical vibrations. This characteristic is also closely-related to the typically-high firing pressures, which may exceed 2000 psi, forcing the use of heavier components, both movable and static. The heavier movable components, such as piston, rod, crankshaft and flywheel present other problems, because they consume more combustion energy to overcome their inertia during engine acceleration. This energy is later dissipated through the brakes during vehicle decelerations, thus wasting it and increasing the fuel consumption. This is not so much a problem for highway trucks, which move at fairly constant speeds, but is a major drawback of the typical variable-speed cycle of automobiles in city operation. The heavier shakier engine begets a heavier vehicle structure and suspension, and the heavier total mass of the engine and vehicle also reflect on the vehicle acceleration, fuel consumption and emissions on a variable-speed cycle.

Another problem with the DI combustion system, is the combustion noise during accelerations following idle periods as typically occurs during passenger-car city cycles. Although the part of this problem dependant on the acceleration of the heavier masses has been described above, it is aggravated by combustion-chamber thermal problems affecting the combustion-kinetics. In essence, the cooling of the chamber during the deceleration preceding an idle (a period during which the fuel is shut-off) and during the idle itself when little fuel is introduced, increase the ignition delay of the fuel, which is a time-temperature dependant process. Then, during the acceleration that follows, more fuel is injected into the cool chamber during its extended chemical-delay period than would be required with a warm chamber. As a result, when the auto-ignition temperature of the fuel is finally achieved, the sudden explosion of the artificially-larger fuel quantity releases more energy, producing a heavier diesel knock. The interesting thing is that the extra quantities of fuel injected during the extended period of ignition delay, contribute to a further extension of it, because the required heat of vaporization of the increased fuel quantity actually cools the air charge even more.

Turning now to the divided chamber IDI combustion system, the benefits and advantages of this type of system were obvious even before Dr. Diesel's time when it was proposed for other combustion systems. A workable design of a diesel pre-combustion chamber by Ricardo in 1919 was intended for large four-valve engines. The Ricardo pre-combustion chamber was located in the cylinder head, central to the cylinder main axis, and in between the four valves. It utilized only one interconnecting passage or throat to the main chamber. The throat was in the form of a venturi so as to reduce the pumping losses of the air charge entering the prechamber and the burning air and fuel charge exiting it, as well as to minimize by diffusion the torch-like effect of the flame impinging on the piston crown. The venturi-type Ricardo design clearly recognized that pre-combustion chambers incurred pressure and energy losses which, ultimately, reduced engine efficiency and required attention. The main purposes of the pre-combustion chambers was to accelerate the combustion process, and to tolerate the poor, erratic injection plumes produced by the low-pressure, hard-to-control, inefficient fuel injection systems of the times. In modern terminology, pre-combustion chambers opened the way for high power-density powerplants. Actually, they provided an escape-route to by-pass the then-unsolvable problems of open-chamber combustion such as the mixing and the requirements for fuel injection with precise injection timing and clean tail-ends.

The IDI process provided by Ricardo was characterized by faster combustion, enabling better air-utilization and higher engine speeds for more power through quicker ignition with lower rate-of-pressure rise and lower maximum firing pressure (both being more agreeable to simpler, lighter engine structures), as well as lower noise. At the time, emissions were of no concern, and fuel consumption was not an issue because the intent was to produce automotive-type (truck and bus) engines with which to replace the very-inefficient, large gasoline engines of the times. As a side benefit, it was also found that the IDI engines produced less smoke than comparatively larger DI engines, even while operating at up to three times the speed, with higher loads and at lower air-fuel (A/F) ratios. The same type of higher-speed IDI engines were also rapidly adapted to other uses, such as construction, marine, industrial and agricultural equipment, mainly by Caterpillar and International-Harvester in the US. In Europe, Franz Lang, the inventor of the plunger and barrel fuel injection system, also designed various pre-combustion chambers, the best known of which was the Lanova. The Lanova introduced Mack, Continental, White and others in the United States to the diesel world and was used until the 1960's. By 1934, a handful of automobiles were produced by the French firm Peugeot, powered by a four-cylinder 1750 cubic centimeters Ricardo-designed engine which was rapidly followed by Mercedes-Benz with its Model 260. All these engines, truck and automotive alike, used two valves per cylinder and side pre-combustion chambers. The Ricardo engines utilized their own pre-combustion chamber, trademarked "Comet", while the Mercedes units also used their proprietary design. Both pre-combustion chamber designs continue to this day, with some modifications.

During the last few years, some Ricardo "Comet" engines have been introduced with three valves, but still using an ancient-design side pre-combustion chamber. Four years ago, Mercedes also introduced an IDI, double overhead camshaft (DOHC), four-valve family of engines, with the pre-combustion chamber now centrally-located. So far, this is the only small four-valve, DOHC diesel engine in production world-wide.

IDI engines are fueled by self-cleaning, single-hole, pintle-type nozzles. The combustion process is too complex to be explained here, but my above-mentioned SAE technical paper No. 960058 describes it in more detail. In general, it is a two-step combustion process characterized by its speed and tolerance of fuel-system inconsistencies that allows operation of present automotive engines (such as the Mercedes IDI engine mentioned above) up to 5000 rpm. Combustion is faster and more complete than with DI systems, with more of the fuel being consumed even with lower amounts of air per cycle (lower A/F ratio) at the same smoke level. Since no swirl is required in the main chamber, high-efficiency directed intake ports can be used instead of the helical ports employed by DI engines, and more air is processed to provide higher volumetric efficiency with smoke-limited A/F ratios of less than 20:1. The combination of higher volumetric efficiency, reduced port-pumping losses, higher engine speed and higher combustion efficiency at lower A/F ratios produce higher power; typically, 10–15% more power at the shaft for similar-displacement engines. The indicated cylinder power is even higher, but two factors contribute to high thermal losses, which are detrimental to power output and fuel consumption. The first is the pumping losses in and out of the pre-combustion chamber and the second is the heat losses through the pre-combustion chamber walls. The technical world has concluded that these problems are unsolvable for small engines, and interest in pre-combustion chamber combustion has been lost, in spite of the fact that the overwhelming majority of pre-combustion chamber combustion characteristics are, for small passenger cars, far superior to those of the DI system. The Ricardo side pre-combustion chamber has remained unchallenged, except by some modifications that other researchers have performed including some work that I have done, as described in my U.S. Pat. No. 5,417,189, issued May 23, 1995 and my aforementioned SAE technical paper No. 960058. The only new application of a pre-combustion chamber system combined with four valves can be found in the new Mercedes-Benz DOHC family. Even so, the pre-combustion chamber and injector tip in this DOHC family differ very little from the 1927 Mercedes-Benz designs. Therefore, to continue enjoying all the benefits of pre-combustion chamber engines, while improving the fuel consumption profile, it is important, amongst other measures, to minimize the two main sources of losses; that is, pumping and thermal as exhibited by the current Ricardo and Mercedes designs. In reality, it is not required that they be eliminated completely. The reason being, as already explained, that the energy released by combustion is far higher than that of the DI system due to the more efficient burn. Therefore, the IDI system can tolerate some losses and still be competitive with DI; however, both sources of heavy losses must be reduced.

Two-Cycle engines of various designs have been used for many years in the widest array of applications; from very small motorcycle engines of less than 50 cubic centimeters per cylinder to giant marine engines with cylinder displacements over one thousand liters. Typically, both the smaller and the larger engines have been of valve-less designs, utilizing various port configurations in the cylinder to affect the supply of air and exit of combustion products. The smaller gasoline engines, typically carburetted, have been used for motorcycles and small commercial applications. The large marine engines, also known as "Cathedral Type" (obviously because of their height), are diesels fueled by one or more injectors on each cylinder and burn on the open-chamber (DI) system. The cylinder scavenging and filling process, proceeds through a set of ports formed along a portion of the bottom of the cylinder, then flowing up to the top of the cylinder and, after combustion and expansion, exiting the cylinder through another set of ports formed along the remaining portion of the cylinder bottom. The "loop" formed by the gas motion within the cylinder gives the process its name ("loop scavenging"). Some intermediate-size designs have used opposed pistons with the two pistons operating against each other in the same cylinder; both connected to different crankshafts geared to each other and disposed at the top and bottom of the engines. Some of the engines operate only as spark-ignited gas versions, with the fuel gas admitted through the intake ports and the spark plugs replacing the fuel injectors.

Some smaller two-cycle engines use the unique Kadenacy Uniflow designs, with valves in the cylinder head and inlet ports around the full periphery of the cylinder at the piston's Bottom Dead Center position. In the US, typical examples of such engines were introduced by General Motors in the early 1930's and are now manufactured by Detroit Diesel Corporation for trucks, marine and industrial applications. Winton, in Cleveland (now General Motors Electromotive Division, in La Grange, Ill.) also introduced similar, but larger engines, for locomotive and other purposes. All these engines now use four valves in the head, and a vertically disposed, centrally located fuel injector for open-chamber, DI combustion. Mechanically driven, positive-displacement Roots blowers supply scavenging and combustion air either alone or in series with exhaust-driven turbochargers. Some other intermediate and large-size engines, such as those supplied by Cooper Energy Services and typically used for gas pipeline pumping stations, are of the valveless, loop-scavenged type, operating strictly as spark-ignited gas engines. Some of these spark-gas engines have resorted to the use of pre-combustion chambers to reduce their emissions levels. On these engines, the main charge of fuel gas is supplied to the main chamber through mechanically actuated gas valves. The pre-combustion chambered versions also receive a small amount of gas, individually injected directly into the pre-combustion chamber, to increase the pre-combustion chamber fuel/air ratio to mixtures richer than stoichiometric; altering the overall combustion process to reduce emissions, especially NOx. This broad explanation of combustion on the various types and sizes of two-cycle engines has been undertaken because the trend towards the use of pre-combustion chambers in these engines has already started, as explained above in the case of the Cooper engines. None of the other two-cycle designs referred to above use pre-combustion chambers, and to my knowledge have never used them; however, it is predicted that they will be forced to use them as tightened environmental regulations are introduced in the future.

Other four-cycle, four-valve American engines from Cooper Energy Services, as well as from Caterpillar and Waukesha have also used pre-combustion chambers for many years, some as pure IDI diesels; others as spark-ignited gas engines. The latter are very popular in environments where low emissions are already closely regulated. With the trend towards the use of pre-combustion chambers, it has been predicted that newer, more efficient pre-combustion chamber designs will be required to minimize the pre-combustion chamber heat losses through heat transfer.

The need to keep the pre-combustion chamber as hot as possible has been acknowledged from the earliest use of the Ricardo "Comet" pre-combustion chamber in 1929. In the "Comet" pre-combustion chamber, the lower inserted portion of the pre-combustion chamber, called the "cup", is made of exotic heat-resistant material such as Nimonic and is designed to maintain an insulating air gap between its sidewalls and the cavity bored inside the head so as to reduce the heat losses. However, with the "Comet" pre-combustion chamber, the upper cavity is typically machined in the structure of the cylinder head and is prone to crack because of the high thermal gradient between the hot inside of the pre-combustion chamber walls and the cooler outside walls exposed to the cooling media compounded by the rates of firing pressure and maximum firing pressures as the fuel is ignited. To avoid this problem the design uses a water jet, typically drilled across the head, between the two valve ports (these engines typically being two-valve engines), both to cool the bridge between the valves and to impinge on the pre-combustion chamber's upper cavity. The upper-half of the pre-combustion chamber, therefore, not only suffers from the normal heat losses through its walls made of parent material exposed to the cooling jacket, but also has to cope with water being impinged upon it to avoid cracking the wall. In the process, it loses a very considerable amount of heat energy.

Some engines, made by Isuzu and others in Japan over fifteen years ago, upgraded the material of the pre-combustion chamber "cup" from Nimonic to ceramics, which has a far lower heat transfer coefficient; however, the top half of the pre-combustion chamber was not changed and still suffered high heat losses. Developments under my direction, using the lower pre-combustion chamber cup from Isuzu engines on an experimental Chrysler engine, proved that the engine not only reduced its fuel consumption by 4–5%, started faster, and produced less noise, but that it also burned faster and cleaner, allowing the injection timing to be retarded for reduced $NO_x$, as well as hydrocarbons, particulates and smoke. Recognizing the fact that the main losses were still through the upper-half of the pre-combustion chamber, my U.S. Pat. No. 5,417,189, issued May 23, 1995, describes a heat shield designed for disposition inside the upper pre-combustion chamber cavity. The heat shield is intended to minimize the high heat losses of the pre-combustion chamber at this location by increasing the total wall thickness and creating an insulating air gap between the shield and the parent-metal cavity. It has been calculated that such shield could improve the engine's fuel consumption another 7–8 percent and all the other combustion parameters as well, by reducing the heat losses.

In addition, SAE Technical Paper 960506 by Kawamura et.al., entitled "Combustion and Combustion Chamber For a Low Heat Rejection Engine", presented at the 1996 SAE International Congress and Exposition, in Detroit, Mich., covered a laboratory research on an IDI engine with fully-insulated cylinders and pre-combustion chambers and indicated that it could produce lower fuel consumption and emissions than a similar engine operating on the DI combustion principle in which the whole cylinder was fully-insulated. The pre-combustion chamber described and disclosed in this technical paper was far cruder than the one described in my U.S. Pat. No. 5,392,744, issued on Feb. 28, 1995 and entitled "Precombustion Chamber For a Double Overhead Camshaft Internal Combustion Engine". This is so because the described pre-combustion chamber's very large-diameter bottom end restricted the valve sizes and its transfer passages had larger flow losses and did not generate any organized swirl motion in the pre-combustion chamber. Nevertheless, the paper indicated that the engine still had low fuel consumption levels. In my mind, therefore, it can be assumed both theoretically and practically that a well designed, centrally located and properly insulated pre-combustion chamber can provide a small, four-valve, high-speed IDI engine with far superior overall operational characteristics than any comparable engine using the DI combustion system.

Accordingly, the present invention is directed to novel means of insulating pre-combustion chambers so as to reduce their heat losses and to extend the use of the improved pre-combustion chambers to different engines which use different fuel and valve train systems.

SUMMARY OF THE INVENTION

In one form of the present invention, the insulating means applied to the pre-combustion chamber consists of a separate thick insulation member sandwiched between a retainer member and the upper portion of the pre-combustion chamber, and a cone-shaped insulation member which encircles most of the tapered pre-combustion chamber bottom portion. Both of the insulation members are encapsulated between the component masses of the cylinder head to prevent passage to the main combustion chamber of any pieces that may break-off from the insulation members during the life of the engine. In another form of the present invention, the pre-combustion chamber includes a similarly constructed pre-combustion chamber which also includes upper and lower housing members combined with a retainer member for maintaining a washer-shaped insulation member in position on the upper housing member. This form of pre-combustion chamber has the lower housing member surrounded by a separate insulation member and has the housing members, the retainer and the insulation members located in a machined opening formed in the cylinder head. The pre-combustion chamber as well as the retainer and the insulation members are retained within the cylinder head opening by a fuel injector support member secured to the cylinder head.

In each form of the present invention, the insulating means applied to the particular pre-combustion chamber has various functions that are derived from the reduction of the heat losses. First, towards the end of the compression stroke, the compressed air transferred from the main combustion chamber to the pre-combustion chamber is at a higher temperature and has a higher energy level at the moment of fuel injection because the heat losses to the prechamber walls and the engine structure or cooling media outside of it, have been reduced by the insulation. Second, the pre-combustion chamber mass, having retained more heat from combustion during the preceding cycle, also contributes to increase the temperature and energy level of the air within it. The higher air temperature resulting from both effects reduces the ignition delay of the fuel, or time that it takes from the beginning of injection until the self-ignition temperature of the fuel is reached and combustion starts. Since fuel under most operating conditions of the engine continues to be injected through and past the ignition delay, any condition which reduces the ignition delay also reduces the quantity of fuel present in the chamber at the moment of ignition. Thus, upon ignition, less fuel burns simultaneously, releasing less instantaneous energy and producing less noise. The noise resulting from all the fuel that burns simultaneously under this condition, is commonly known as "Diesel Knock" or better known in more technical terms as "detonation". One reason to minimize the delay period is to minimize the noisy diesel knock. Quicker ignition and earlier combustion of the first-injected amount of fuel also contributes to faster combustion of the successive amounts of fuel injected into the pre-combustion chamber after ignition. This creates higher pressures within the pre-combustion chamber to force the contents of the pre-combustion chamber into the main combustion chamber at a faster rate, with higher temperature and in a higher state of energy. As a result, a faster rate of burn is activated in the main combustion chamber and produces a shorter burn overall. The insulation also controls the heat losses during the period of pre-combustion chamber combustion so that the products of complete or incomplete pre-combustion chamber combustion discharged to the main chamber do so even with higher energy levels in the form of temperature and velocity. Thus, further contributing to a faster, more complete combustion of the air in the main chamber with the raw fuel and partially burnt fuel exiting the pre-combustion chamber. This condition, by itself, should reduce the amount of exhaust smoke, which is typically considered as the limiting factor on engine power. Therefore, by using more of the air and fuel with less or equal smoke levels than obtained with a non-insulated pre-combustion chamber, the engine produces more power and improves the fuel economy. The insulated pre-combustion chamber also reduces heat rejection during the other phases of the combustion cycle such as intake and exhaust, to further improve engine efficiency. Therefore, by burning the fuel in a more efficient manner, it is possible to achieve the following improvements, either individually or in combination: increased power, lower fuel consumption, lower emissions and lower noise levels.

One major problem with diesel engines is that of cold startability. On pre-combustion chambered engines and during the last few years on open-chamber designs also, one method of warming up the combustion chamber to achieve successful starts is based on the use of a glow-plug. The glow-plug is electrically energized following the turn of the ignition key to the "start" position and after a waiting period of a certain amount of time, allows the engine to be started without excessive cranking. This could result in a mediocre start which, in many cases, might be followed by a warm-up period characterized as very noisy, very irregular, and with a dirty and white smoke indicative of partial or total misfires. Since insulation can help keep the heat of the glow-plug and the heat of compression in the pre-combustion chamber, it naturally follows that it should reduce the waiting period and, in many cases, allow an immediate start without a wait. Additionally, since the insulation will tend to keep the heat of combustion during the first few cycles, the period of engine warm-up should be either eliminated or reduced and no vibrations, noise or white smoke should follow the start except under temperature conditions at which an uncooled pre-combustion chamber would not even fire. Another benefit that should be achieved with an insulated pre-combustion chamber is that upon engine shutdown, the insulated pre-combustion chamber should be kept hotter for a longer period of time and, if the engine is re-started during the extended period, it should do so faster and cleaner, with less noise, fuel consumption, and emissions.

It is therefore the intent of the present invention to improve the design of the pre-combustion chamber disclosed in my above-mentioned U.S. Pat. No. 5,392,744, so as to reduce heat losses as well as to make the pre-combustion chamber usable in a variety of applications, with different types of valve trains and combustion cycles.

BRIEF DESCRIPTION OF THE DRAWINGS

The above and other features, objects and advantages of the present invention will be more apparent from the following detailed description when taken with the drawings in which.

DETAILED DESCRIPTION OF THE INVENTION

Figure 1:
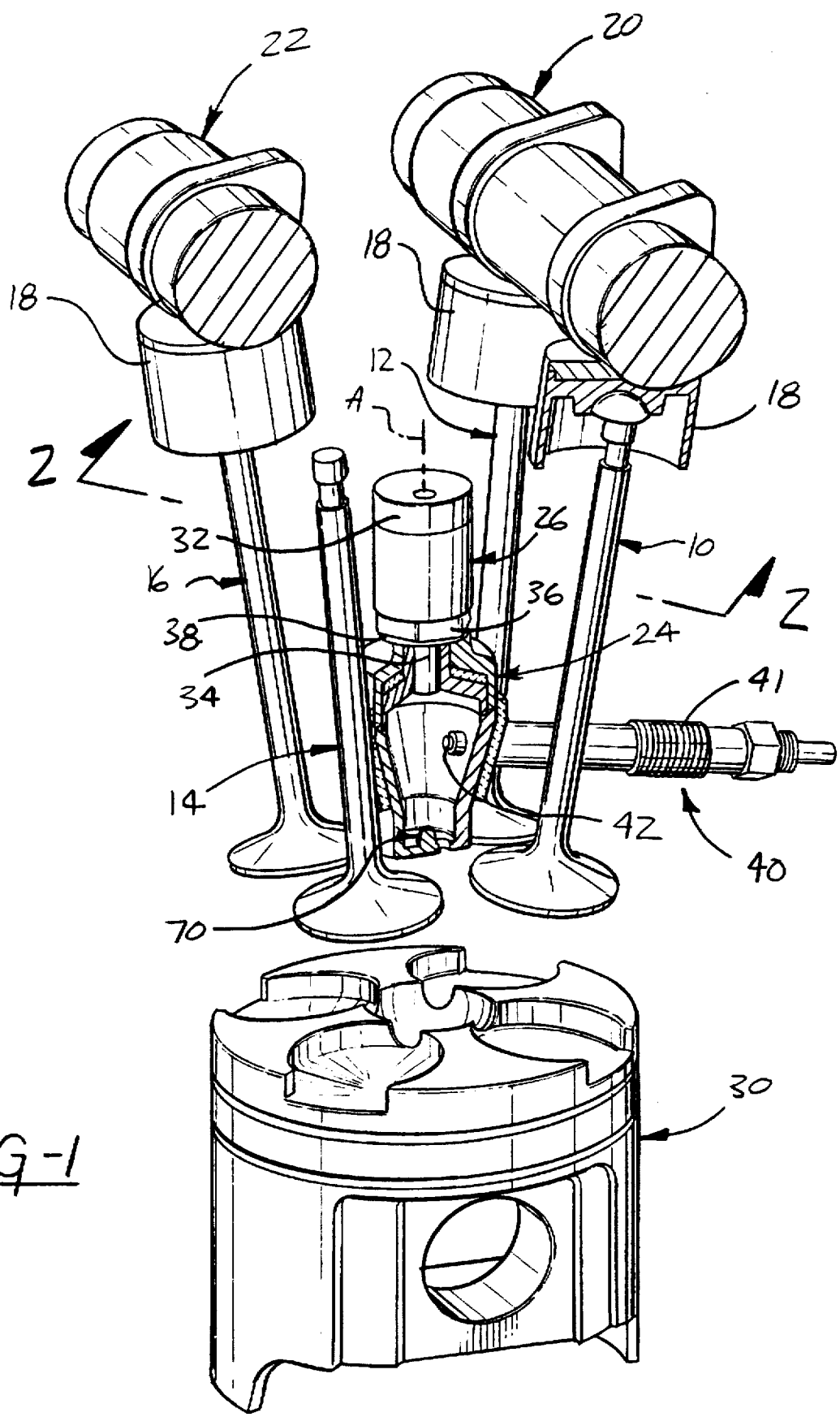
FIG. 1 is a partial isometric view of an insulated pre-combustion chamber in accordance with the present invention installed in a radial-valve cylinder head.

Referring now to the drawings and more particularly to FIG. 1, a partial perspective view is shown of the combustion system components of a four-cycle IDI engine utilizing four radial valves 10, 12, 14, and 16. The valves 10 and 12 are intake valves while the valves 14 and 16 are exhaust valves each of which is driven directly through a special inverted bucket tappet 18 by double overhead camshafts (DOHC) 20 and 22 as described in my U.S. Pat. No. 5,570,665 issued on Nov. 5, 1996. Although not shown in FIG. 1, it will be understood that the valves 10–16 as well as a pre-combustion chamber 24 and a fuel injector 26 are disposed in a cylinder head 28 (seen in FIG.2) which is secured to an engine block (not shown). The pre-combustion chamber 24 has its longitudinal center axis substantially centered with the axial centerline of a piston 30 which is disposed for reciprocal movement within a cylinder (not shown) forming part of the engine block. The lower section of the fuel injector 26 is shown, composed of the lower part of a nozzle holder 32 and an nozzle tip 34 firmly attached to the holder 32 by a threadably disposed tip nut 36 engaging the nozzle holder 32. The injector 26 is aligned substantially vertically and centrally with respect to the pre-combustion chamber 24 with a gasket 38 disposed between the flat bottom of the tip nut 36 and the upper flat surface of the pre-combustion chamber 24. The injector 26 can be secured in place by a variety of common means, none of which is shown. Also, common means of supplying fuel to the injector 26 and returning injector leak-off fuel to the fuel tank, are not shown. A glow plug 40 is provided with its tip 42 protruding into the inner cell area of the pre-combustion chamber 24 through a hole 43 formed in the side wall of the pre-combustion chamber 24. The glow plug 40 is inserted through a boss 44 (FIG. 5) integrally formed with the lower portion of the pre-combustion chamber 24. The large body of the glow plug 40 is secured by threads 41 to a proper boss cast integrally with the cylinder head 28 of parent-metal such as aluminum or iron.

Figure 2:
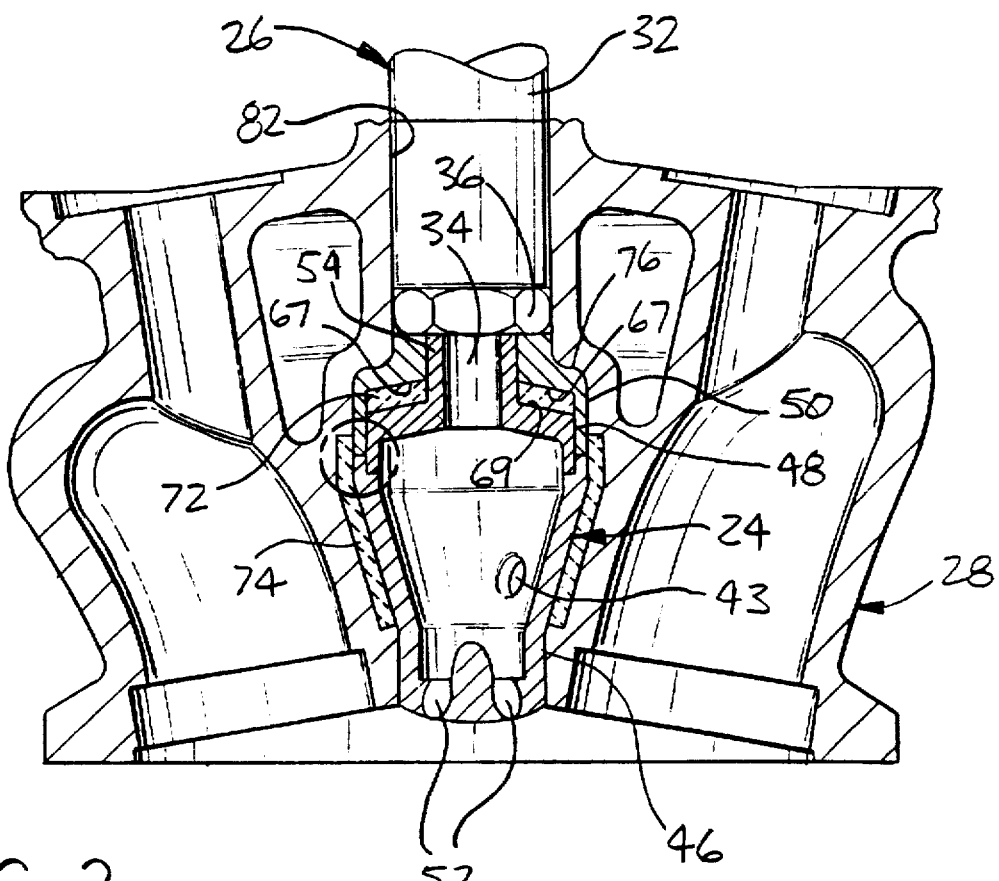
FIG. 2 is a cross-sectional view of the insulated pre-combustion chamber taken along line 2—2 of FIG. 1 and showing in part the structure of the cylinder head that encapsulates the pre-combustion chamber.

FIG. 2 is a cross-sectional view taken on line 2—2 passing through valves 10 and 16 and through the cylinder head 28 as shown in FIG. 1. For clarity purposes, the valves 10, 16 are not shown in FIG. 2 although the cavities into which these components would be disposed are shown. More specifically and as seen in FIGS. 2, 3, 5 and 6, the pre-combustion chamber 24, according to the present invention, is encapsulated within the cylinder head 28 and includes three metal parts, namely, a lower housing member 46, an upper housing member 48, and a retainer member 50. As seen in FIGS. 2 and 6, the lower housing member 46 is larger in diameter at its upper end than it is at its lower end and terminates with a plurality of transfer passages 52 formed in the lower end of the lower housing member 46. The transfer passages provide communication between the inner cell area of the pre-combustion chamber 24 and the main combustion chamber formed between the top of the piston 30 and the cylinder head 28. Although not shown, the transfer passages 52 are circumferentially spaced about the longitudinal center axis of the pre-combustion chamber 24 and can be of the type and number as disclosed in my aforementioned U.S. Pat. No. 5,392,744.

Figure 3:
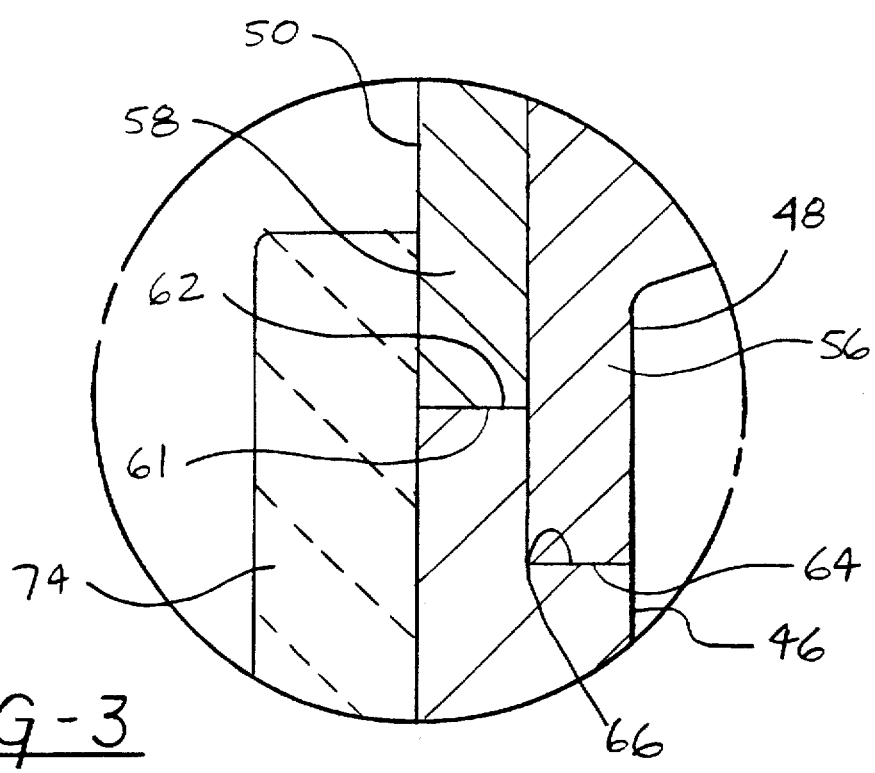
FIG. 3 is an enlarged view of the circled area of FIG. 2.

As seen in FIGS. 2, 3 and 6, the upper housing member 48 is formed with a tubular collar 54 that accommodates the injector tip 34 and is integral with a depending circular stem portion 56. The retainer member 50 has a cylindrical skirt portion 58 merging with an upper ring section 60 which defines a circular opening 59 adapted to mate with and surround the collar section 54.

As best seen in FIG. 3, the upper end of the lower housing member 46 and the lower end of the skirt portion 58 of the retainer member 50 are piloted by the stem portion 56 of the upper housing member 48. A flat bottom surface 61 formed at the lower end of of the skirt portion 58 of the retainer member 50 abuts a flat top surface 62 of the lower housing member 46 to maintain proper height between the retainer member 50 and the lower housing member 46. Also, a flat bottom surface 64 of the upper housing member 48 abuts a flat stepped surface 66 counter-bored in the upper end of the lower housing member 46. In this way, a cavity of controlled height is formed between the upper internal surface 67 of the retainer member 50 and the outer upper surface 69 of the upper housing member 48 as seen in FIG. 2. In addition, as seen in FIGS. 2 and 6 the top flat upper surface 68 of the retainer member 50 is positioned in horizontal alignment with the top flat upper surface 70 of the collar 54. As should be apparent, the design of the lower and upper housing members 46 and 48 and the retainer member 50 is such as to provide proper alignment of the parts during a joining process (such as electron-beam) so as to provide a metallic single-piece pre-combustion chamber as seen in FIG. 2.

Prior to joining the three metallic parts 46, 48, and 50 of the pre-combustion chamber 24 together, a washer-shaped insulation member 72 is placed over the collar 54 onto the outer upper surface 69 of the upper housing member 48. The retainer member 50 is then placed over the insulation member 72 and the lower housing member 46 is connected to the upper housing member 48 and the retainer member 50 to provide the interlocking joint seen in FIG. 3. Thus, the insulation member 72 occupies the aforementioned cavity between the retainer member 50 and the upper housing member 48 and is completely encapsulated between the two metallic members. After welding the three metallic parts of the pre-combustion chamber 24 together, a cone-shaped insulation member 74 is fitted to the lower housing member 46 and bonded or glued thereto using a high temperature resistant adhesive so as to maintain the insulation member 74 in the position shown relative to the lower housing member 46.

Each of the insulation members 72 and 74 can be made of a flexible high-temperature ceramic mat such as produced by 3M Company of Minneapolis, Minn. and which, I believe, is known as either "Ceramatt" or "Ceramet". If preferred, the insulation members 72 and 74 can be made of solid high temperature ceramic. Any other well known high temperature resistant material having insulating properties can be used. Conversely, the top insulation member 72, if desired, can be disposed of to rely only on the insulation properties of the air cavity into which it is normally inserted. The thickness of each of the insulation members should be sufficient so that at least 50 to 75 percent or a majority of the heat generated within the pre-combustion chamber can be retained. This may require a mat thickness of from one to four millimeters or possibly more depending upon the type of material used for insulating the side walls of the pre-combustion chamber 24. Once the pre-combustion chamber 24 is combined with the insulation members 72 and 74 as explained above, the entire assembly is then placed in a casting flask in the form of a solid core and cast integrally with the cylinder head 28. In this manner, the pre-combustion chamber 24 together with the insulation members 72 and 74 become part of a single integral unit. The pre-combustion chamber 24 is firmly retained in the cylinder head casting 28, by having part of the casting covering a shoulder 76 of the retainer member 50 and cooperating with the tapered conical design of the lower housing member 46. It is possible when a thick-walled lower housing member 46 is available to have the tapered end of the glow plug 40 seal against a tapered seat properly machined flush on the outside surface of the lower housing member 46. In such case, the glow plug 40 would fit through a large hole formed in the insulation member 74 so as to allow the casting parent metal to flow into it.

Figure 5:
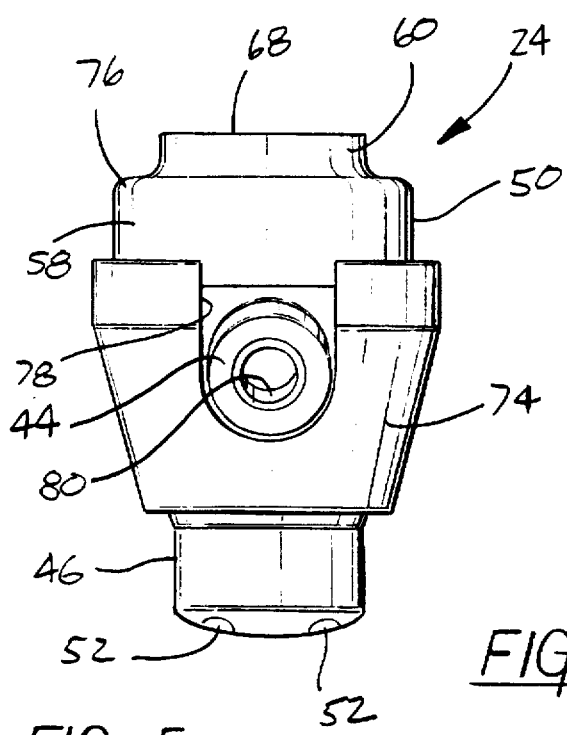
FIG. 5 is a side elevational view of the lower housing member of the pre-combustion chamber seen in FIGS. 1–3 and FIG. 4 surrounded by an insulation member.
Figure 6:
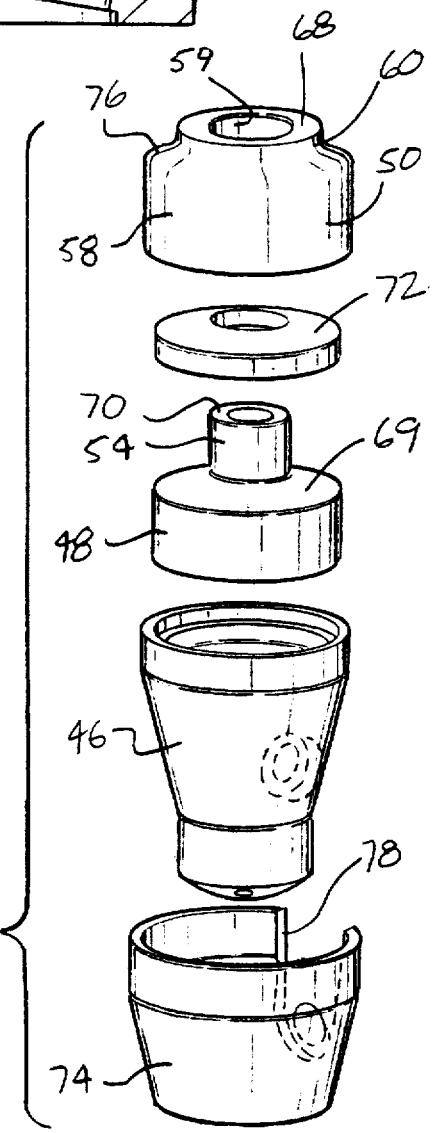
FIG. 6 is an exploded view showing the various parts of the insulated pre-combustion chamber of FIGS. 1–3.

FIG. 5 shows one configuration of the insulation member 74 if it should be made of solid ceramics. As seen in FIG. 5, a U-shaped notch 78 is provided in the upper section of the insulation member 74 through which the boss 44 extends sideways from the lower housing member 46. A boss such as boss 44 would be provided when the wall of the member 46 is too thin to allow a tapered glow plug seat to be machined directly on it as described above. The boss 44 has a conical seat 80 for the end-body of the glow plug 40 to seal the pre-combustion chamber 24 against leakage through the outside of the glow plug 40. An alternative design for the insulation member 74 would be to make the insulation member 74 in two pieces, split down the center of the boss 44 so as to allow proper insulation above the boss 44. Another alternative solution is to use the configuration shown in FIG. 5 for the basic coverage of the lower housing member 46 in conjunction with a smaller piece bonded to member 46 to fill the empty space above the boss 44.

After the cylinder head 28 is appropriately machined to accommodate the valve train components, the fuel injector 26 can be guided into the hole 82 (FIG. 2) in the cylinder head 28 with the nozzle tip 34 extending into the annular opening defined by the collar 54. The injector 26 is then tightly secured to an upper portion of the cylinder head 28 so as to exert a downward force on the pre-combustion chamber 24 and seal its tapered lower body against the surrounding cast walls of the cylinder head structure. The intent is to prevent leakage of combustion gases into the main combustion chamber past the pre-combustion chamber 24 and the injector 26, as well as to prevent lubricating oil above the cylinder head 28 from penetrating down and entering the main combustion chamber.

Figure 4:
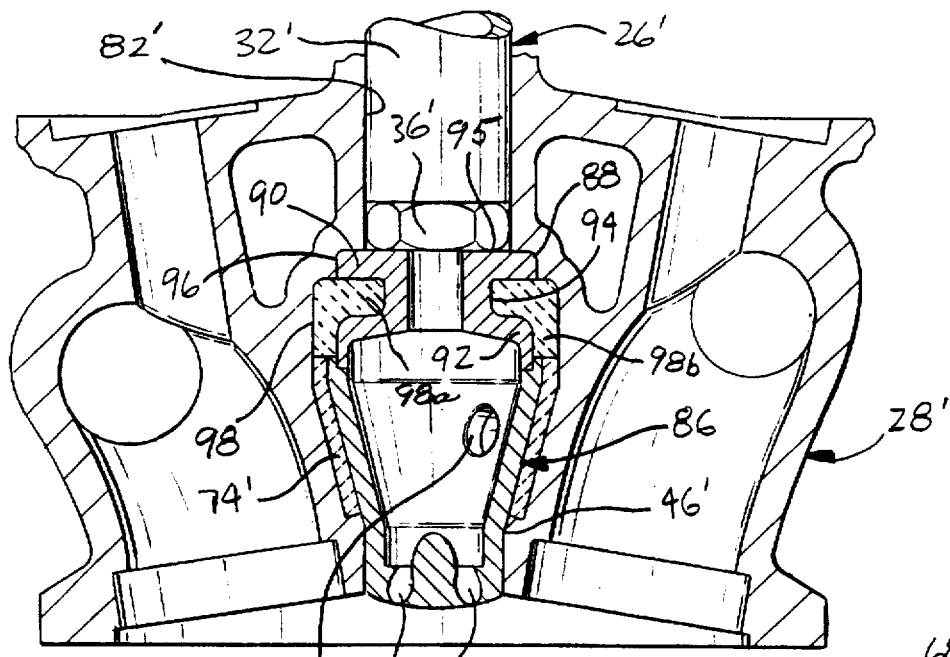
FIG. 4 is a modification of the pre-combustion chamber shown in FIGS. 1–3.

A modified version of the pre-combustion chamber 24 is shown in FIG. 4 and is identified by the reference numeral 86. It will be noted that the parts of the pre-combustion chamber 86 that are structurally the same as those of the pre-combustion chamber 24 will be identified by the same reference numerals but primed.

As seen in FIG. 4, the lower housing member 46' has its upper end rigidly secured to the lower end of an upper housing member 88 by an interlocking connection similar to that provided in the pre-combustion chamber 24 between the upper and lower housing members 48 and 48. In this case, however, the upper housing member 88 is not combined with a retainer member such as the retainer member 50 provided in the pre-combustion chamber 24. Instead, the upper housing member 88 is generally shaped as a spool having an enlarged head 90 which cooperates with a stem portion 92 to define an annular groove 94. The head 90 of the housing member 88 provides a solid flat seat for the injector nut gasket (not shown) and has a diameter greater then the diameter of the opening 82'. Also, a shoulder portion 96 at the periphery of the head serves as an anchor point for the pre-combustion chamber 86 by trapping it into the cast structure of the cylinder head 28'. With this design, an inverted L-shaped ceramic insulation member 98 has an arm portion 98a which extends into the groove 94 and a leg portion 98b which covers the stem portion 92 of the upper housing member 88. As in the case of the pre-combustion chamber 24, the lower housing member 46' has its upper tapered portion covered by a cone-shaped insulation member 74'. As should be apparent, the insulation member 98 will be made as two parts so it can be assembled onto the upper housing member 88. In addition, both insulation members 74' and 98 would be bonded to the respective housing members 46' and 88 prior to having the cylinder head 28' cast around the pre-combustion chamber 86.

Figure 7:
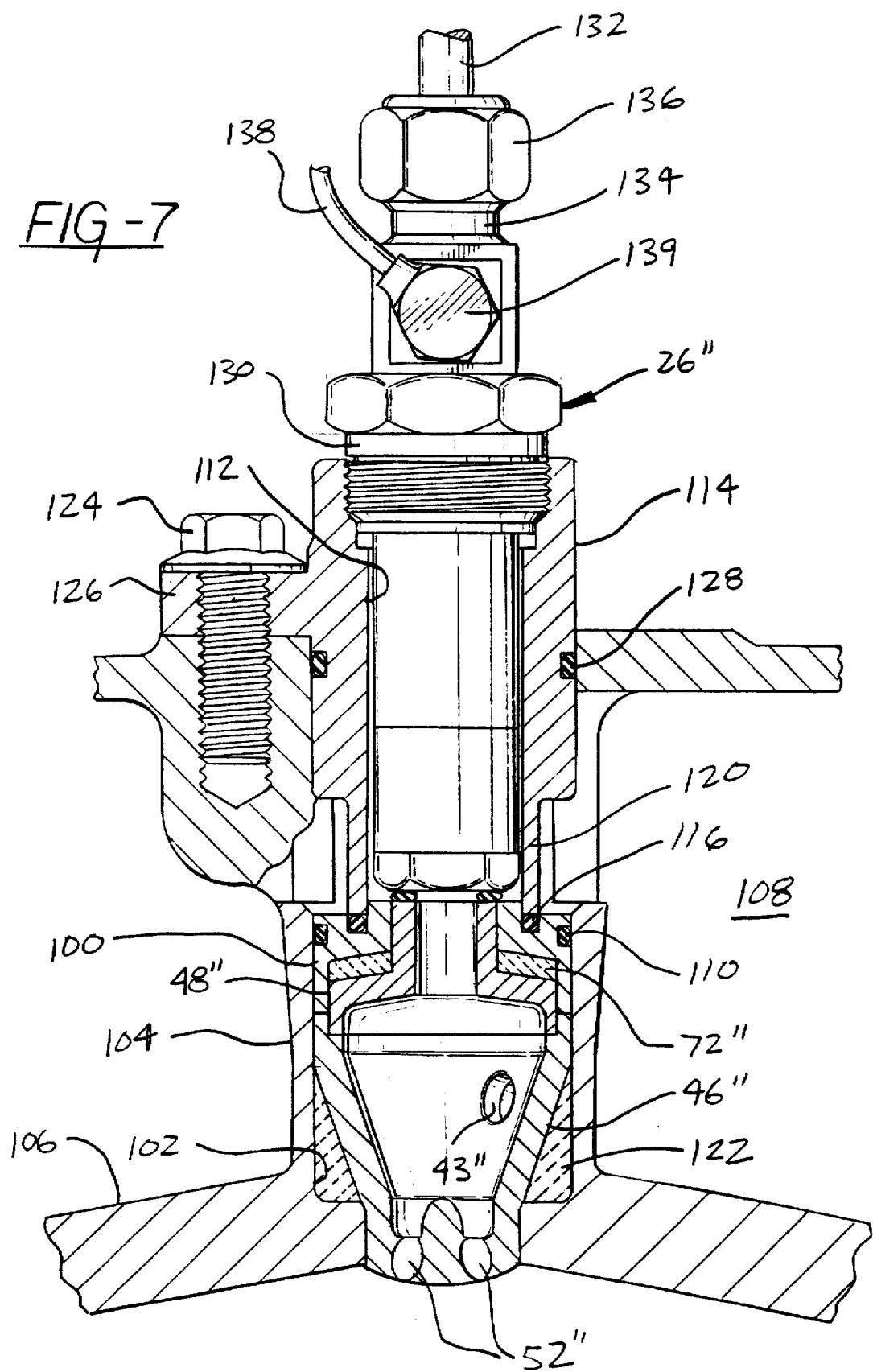
FIG. 7 is an elevational view partially in section showing a pre-combustion chamber similar to that seen in FIGS. 1–3 incorporated with a fuel injector in a valveless two cycle engine.

FIG. 7 shows a pre-combustion chamber arrangement primarily, but not exclusively, intended for valveless two-cycle engines in which there is no "overhead" cylinder head of the type seen in FIGS. 1–4. Inasmuch as there is no valve train, the fuel injector system can be exposed to the atmosphere. In this instance, the pre-combustion chamber shown is removable in its entirety to simplify the development process and service. As in the case of the pre-combustion chamber 24 of FIGS. 1–3, this pre-combustion chamber consists of three metal parts, two of which are essentially the same in construction as two of the parts of the pre-combustion chamber 24. Accordingly, those parts of the FIG.7 pre-combustion chamber arrangement that are essentially the same as the parts of the pre-combustion chamber arrangement of FIGS. 1–3 will be identified by the same reference numerals but in this case will be double primed.

As seen in FIG. 7, the pre-combustion chamber shown includes a lower housing member 46", an upper housing member 48", and a retainer member 100 all of which are joined together and rigidly interconnected through a welding operation as explained above in connection with the pre-combustion chamber 24. The pre-combustion chamber is designed for slidable installation into a machined cylindrical cavity 102 formed in an upstanding boss 104 which is an integral part of a cylinder head structure 106. In order to prevent possible passage of coolant from a cooling jacket chamber 108 to the cylinder below the pre-combustion chamber, the cylindrical outer surface of the retainer member 100 is formed with an annular groove having an "O" ring 110 made of high temperature resistant silicone rubber. Also, in order to seal the cooling jacket chamber 108 from a multi-diameter opening 112 within a support or holder 114 for a fuel injector 26", a ring-like groove is provided in the top surface of the retainer member 100 for a soft-metal ring 116. The "O" ring 110 seals against the smooth interior surface of the cylindrical cavity 102 in the boss 104; but the metal ring 116 seals the opening 112 by having a lower end 120 of the injector holder 114 extending downward in sealing engagement with the metal ring 116. In this embodiment, the lower insulation member 122 adjacent the housing member 46" has a slightly different exterior shape than the insulation member 74, however, the upper insulation member 72" would be identical in configuration as the insulation member 72 incorporated with the pre-combustion chamber 24. The injector holder 114 is a separate unit, solidly attached to the cylinder head by hold-down bolts 124 (only one shown) through ears 126 (only one shown) extending outwardly from the main body of the holder 114. An "O" ring 128, disposed in a groove machined on the outside diameter of the holder 114 prevents coolant leakage from the cooling jacket chamber 108 to the atmosphere. The fuel injector 26" is threadably attached to the upper portion of the injector holder 114 by the injector hold-down nut 130 or by other conventional methods well known to those versed in the practice of engine design. High-pressure fuel is fed to the injector 26" by a pump (not shown) and through a fuel line 132 attached to an injector fitting 134 by a line-nut 136. Nozzle leak-off fuel is conventionally collected by a system of low pressure tubing 138. One branch of the tubing 138 is attached to the fuel injector 26" by a banjo bolt 139 threadably inserted in a hole (not shown) which, in turn, connects with the fuel return passage (not shown) drilled inside the nozzle holder.

Figure 8:
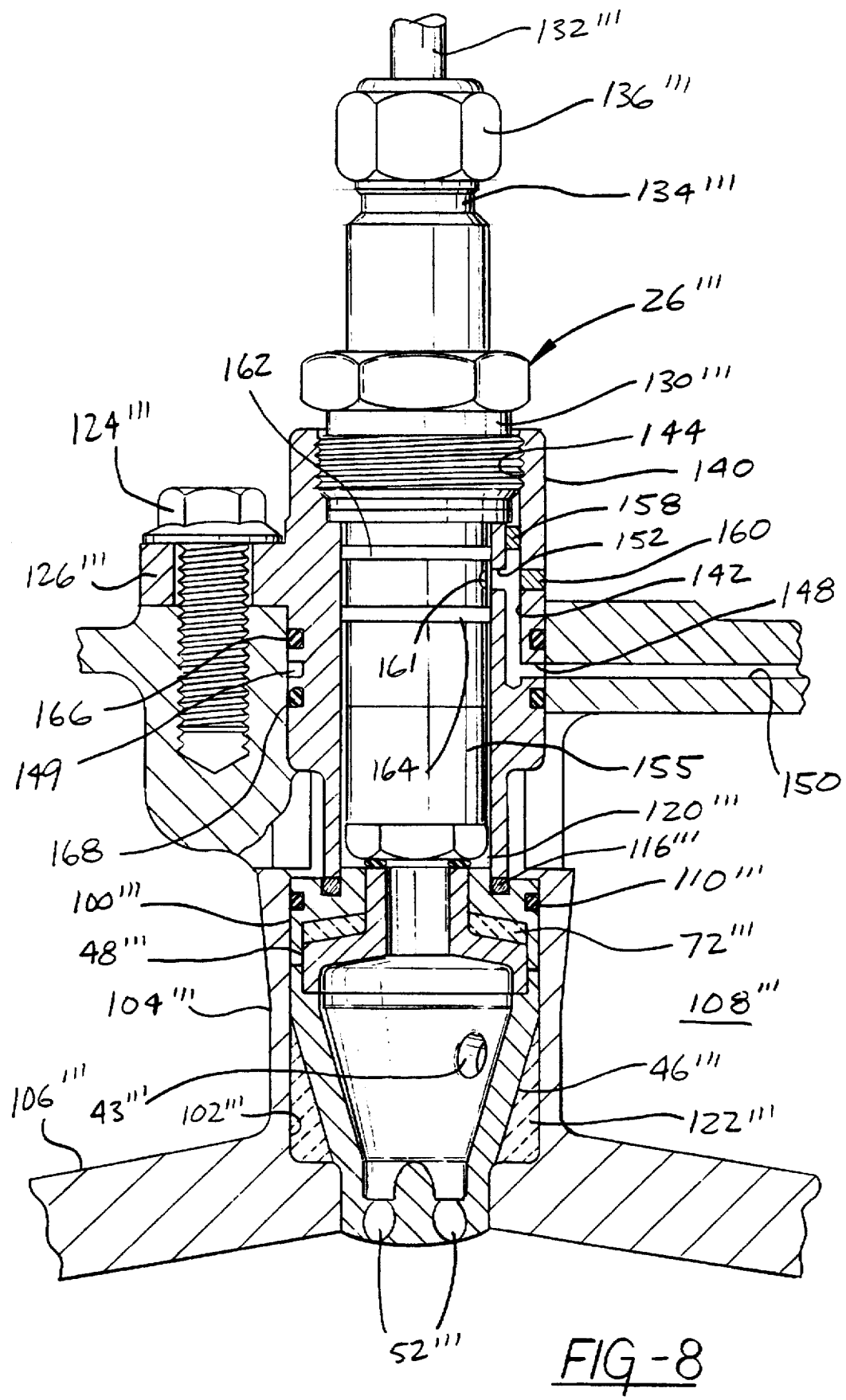
FIG. 8 is an elevational view similar to the view seen in FIG. 7 except that the support for the fuel injector is provided with internal passages for the return of leak-off fuel.

FIG. 8 shows a pre-combustion chamber arrangement and a fuel injector arrangement that is substantially identical to that shown in FIG. 7 but offers an alternative solution to the fuel return problem, applicable to any kind of diesel engine, with any type of valve train. This modification results in a lower cost arrangement than the fuel return arrangement seen in FIG. 7, and avoids the possibility, on engines having a valve train, of having fuel leaking into the overhead and contaminating the lubricating oil or leaking to the ambient in case of two-cycle valveless engines. Note that the parts seen in FIG. 8 that correspond to the parts seen in FIG. 7 are identified by corresponding reference numerals but are triple primed.

In this embodiment, a modified injector holder 140 allows the return of the injector leak-off fuel through the tank in a novel fashion. The modified fuel leak-off passages and sealing-control are affected by modifying the injector body internally so that its fuel leak-off is accomplished through a hole drilled radially at a much lower point in the holder 140 than is shown in FIG. 7 for the case of the banjo bolts 139. Fuel return holes so repositioned, low on the holder 140, are being used today in new cylinder head designs that properly seal the injector from leakage around its body and in which the hole registers directly, without going through an intermediate piece (such as a nozzle holder) with a matching hole drilled through dedicated bosses cast integrally in the cylinder head structure and joined all together by a master passage or gallery through which the fuel is conducted to a point on an outside wall of the head. At that point, a fitting is installed to connect the fuel return lines back to the fuel tank.

The novel feature of the fuel return arrangement shown in FIG. 8 is that, with the repositioned leak-off hole as described above, the modified injector holder 140 is formed with a vertical hole or passage 142 drilled through its thick wall parallel to its longitudinal centerline prior to machining its female thread 144 for the injector hold-down nut 130"'. Hole 142 is drilled to a depth where it connects with a short hole 148 that registers with an annular groove 149 to provide constant registration with the gallery branch passage 150, which in turn, is in fluid connection with a main gallery (not shown) through which all the fuel from the individual injector leak-off holes returns to the fuel tank. Another hole 152 is drilled radially through the thick outside wall of the injector holder 140, completing the continuous fluid connection between the fuel leak-off hole 161 in the nozzle holder 155 and the fuel tank (not shown). Appropriate plugs 158 and 160 seal the unused open ends of holes 142 and 152, respectively. The fuel return hole 161, in this case, engages the internal leak-off hole in the injector holder (not shown), and the whole expensive fuel return tubing, fittings and banjo bolts shown in FIG. 7 is disposed of. In this particular case, in order to seal the fluid connection between holes 152 and 161 from leakage to the overhead and to the coolant jacket in the head, "O" rings 162 and 164 are disposed in matching grooves formed in the nozzle holder 155; both above and below the fuel-return hole 161. Also, "O" rings 166, 168 installed in appropriate grooves are provided on the outside wall of the injector holder 140, straddling the groove 149 to seal-off possible communication or leakage between the hole 148, groove 149 and the cooling jacket or to the ambient. The novelty of this embodiment consists of the series of drilled holes 142, 148, 152 and "O" rings 162, 164, 166, 168, disposed in the injector 26"' and injector holder 140 to provide the appropriately sealed fluid passages needed to close the circuit to the fuel tank.

Figure 9:
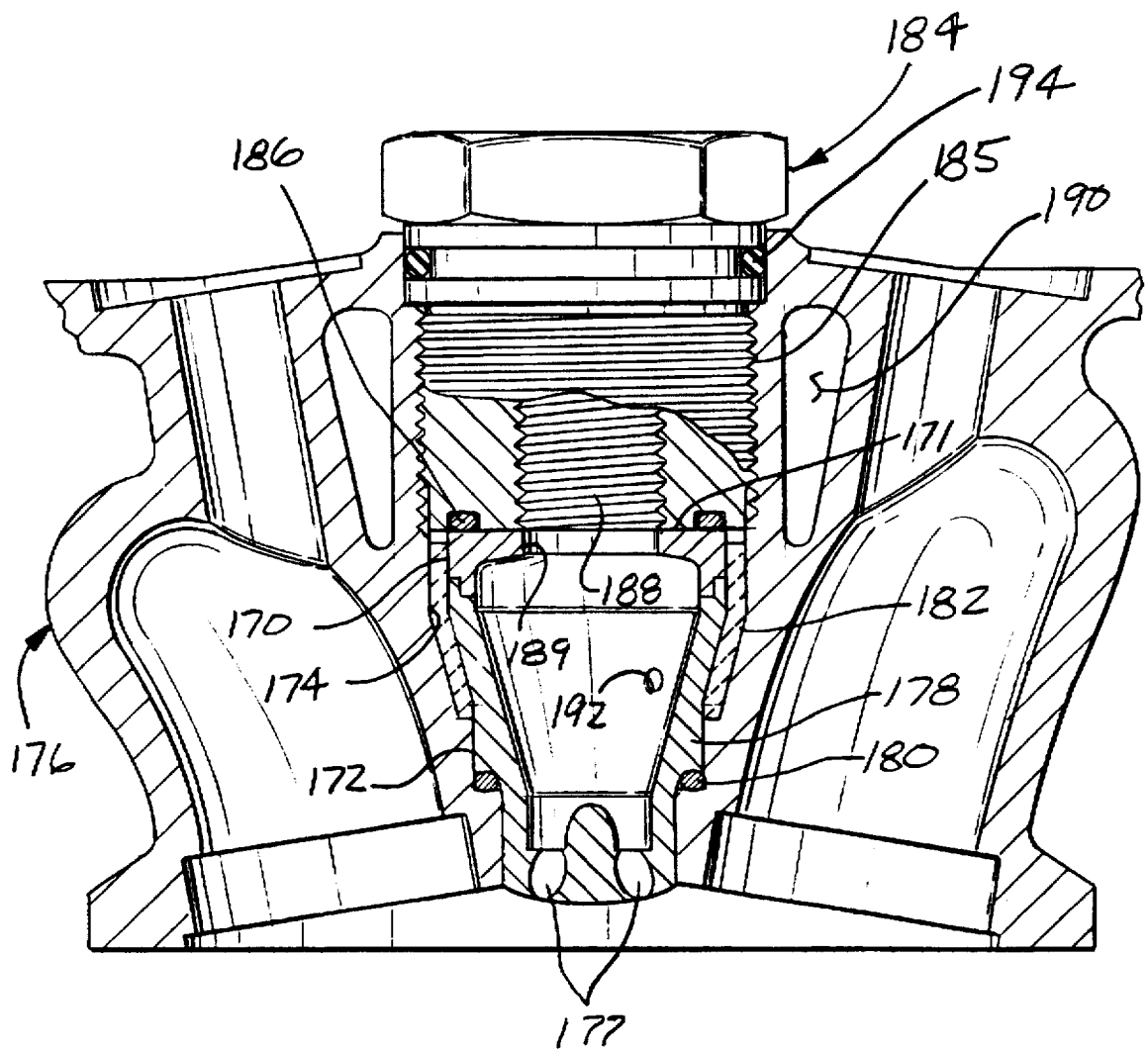
FIG. 9 is a further modified version of the pre-combustion chamber of FIGS. 1–3 for use on four or two cycle engines that operate on the spark-gas (natural gas) combustion system.

FIG. 9 shows a two-piece pre-combustion chamber arrangement which includes an upper housing member 170 and a lower housing member 172, modified for use on both four and two-cycle engines, with or without valves, that operate on the spark-gas combustion system and that use a pre-combustion chamber to control emissions, especially $NO_x$. In this embodiment, the pre-combustion chamber is located in a multi-dimensional cavity 174 machined through the height of the walls of a cylinder head structure 176. The upper housing member 170 is provided with a flat top surface 171 of a diameter substantially equal to the diameter of the upper portion of the cavity 174. The lower housing member 172 is generally conical in configuration with its lower end being provided with transfer passages 177 connecting the pre-combustion chamber with the main combustion chamber. In addition, the lower housing member 172 is formed with a radially outwardly extending flange 178 abutting a shoulder formed as part of the cylinder head 176 with a gasket 180 placed therebetween to prevent leakage of combustion gases out of the main combustion chamber. As in the cases of the pre-combustion chambers described above, the upper housing member 170 is piloted into the upper end of the lower housing member 172 so as to assure alignment during assembly of the housing members. A single cone-shaped insulation member 182 is positioned so that it covers most of the lower housing member 170 and extends above the latter member to cover the outer side-wall of the upper housing member 172. The upper and lower housing members 170 and 172 are joined together through the manufacturing interlocks as provided in the pre-combustion chamber 86 disclosed in FIG. 4 hereof. As in the case of the pre-combustion chambers of FIGS. 7 and 8, the pre-combustion chamber, composed of the upper and lower housing members 170 and 172, is not retained within the cylinder head 176 through a casting operation. Instead, the pre-combustion chamber is located within the machined cavity 174 in the cylinder head and, in this case, is tightly supported in place by a bushing 184. The bushing 184 is threadably secured by threads 185 to the upper part of the cavity 174 with an O-ring type seal 194 interposed therebetween, and has its lower flat bottom surface abutting a flat top surface 171 of the upper housing member 170. A metal ring 186 is located between the two surfaces so as to seal the pre-combustion chamber from leakage. The hollow bushing 184 is provided with internal threads 188 at its lower end to receive a spark plug, the spark producing portion of which would be positioned with a circular opening 189 centrally formed in the upper housing member 170. This type of spark-ignited gas engines present unusual and somewhat contradictory requirements. For example, whereas it is necessary to reduce the heat losses from the pre-combustion chamber, the spark plug itself must be cooled to eliminate the possibility of it becoming so hot that it acts as a glow plug to ignite the mixture uncontrollably. This could force the designer to eliminate the top pre-combustion chamber insulation and provide good cooling for the spark-plug. In this instance, however, a sizeable length of the spark-plug bushing 184 is exposed to the cooling jacket chamber 190 through the upper walls of the cavity 174. Since this type of engine ignites the fuel with a spark and not by compression-ignition, a glow-plug as previously shown in connection with the diesel engines is not necessary, but a small gas feed hole is required. Accordingly, a hole 192 normally for a glow plug is modified to provide gas to the cell area of the pre-combustion chamber. A conventional arrangement with a gas line and valve (both not shown) are disposed in fluid connection with hole 192. This type of pre-combustion chamber, when used for two-cycle loop-scavenged (valveless) spark-ignited gas engines and if desired, can have more than the four transfer passages communicating with the main combustion chamber of the engine as shown in my aforementioned '744 patent. Since these engines are typically used for long-service life in industrial applications, the threaded, removable disposition of the pre-combustion chamber facilitates repairs or replacements.

Various changes and modifications can be made in the pre-combustion chambers described above without departing from the spirit of the invention. Such changes and modifications are contemplated by the inventor and, therefore, he does not wish to be limited except by the scope of the appended claims.

The embodiment of the invention in which an exclusive property or privilege is claimed are defined as follows:

1. In an internal combustion engine having a cylinder and a piston disposed in said cylinder for reciprocal movement relative thereto, a cylinder head over said cylinder and piston to form a main combustion chamber, a pre-combustion chamber located in said cylinder head above said main combustion chamber, said pre-combustion chamber including an upper housing member and a lower housing member and a retainer member all rigidly interconnected and being formed so as to provide an annular cavity between said retainer member and said upper housing member, said lower housing member having transfer passages formed therein connecting said pre-combustion chamber to said main combustion chamber, a pair of separate and independent insulation members, one of said pair of insulation members being located in said cavity and the other of said pair of insulation members being located between said lower housing member and said cylinder head for reducing the heat loss from said pre-combustion chamber.

2. The internal combustion engine of claim 1 wherein one of said housing members is provided with a stem portion piloted into the other of said housing members so as to maintain alignment of said upper and lower housing members during final assembly.

3. The internal combustion engine of claim 1 wherein said cylinder head has a machined opening above said main combustion chamber for accommodating said upper and lower housing members and said pair of insulation members, a fuel injector located above said upper housing member and having a nozzle portion extending through said upper housing member into said pre-combustion chamber for supplying fuel to said pre-combustion chamber, and a support for securing said fuel injector to said cylinder head and for maintaining said upper and lower housing members and said pair of insulation member in said machined opening.

4. The internal combustion engine of claim 3 wherein said support is provided with internal drilled passages for allowing leak-off fuel to flow from said fuel injector and through a gallery branch passage to the fuel tank connected to the engine.

5. The internal combustion engine of claim 1 wherein a fuel injector is located above said upper housing member and has a nozzle portion, said upper housing member having an opening formed therein for accommodating said nozzle for supplying fuel into said pre-combustion chamber, and said one of said pair of insulation members takes the form of a washer surrounding said nozzle.

6. The internal combustion engine of claim 5 wherein said retainer member serves as a cover for said one of said pair of insulation members surrounding said nozzle and cooperates with said upper housing member for maintaining said one of said pair of insulation members in position on said upper housing member.

7. The internal combustion engine of claim 6 wherein a support is fixed to said cylinder head, said support having a multi-dimensional opening for supporting said fuel injector above said pre-combustion chamber.

8. The internal combustion engine of claim 7 wherein said pre-combustion chamber is located in a machined opening in said cylinder head in alignment with and below said multi-dimensional opening for accommodating said upper and lower housing members and said insulation members and said retainer member, and sealing means provided between said retainer member and said machined opening and between said retainer member and said support so as to prevent leakage of coolant from the cooling jacket chamber of the cylinder head into the said main combustion chamber and into said multi-dimensional opening.

9. The internal combustion engine of claim 6 wherein said cylinder head is cast about said pre-combustion chamber so as to encapsulate said retainer, said pair of insulation members, and said upper and lower housing members within said cylinder head.

10. The internal combustion engine of claim 9 wherein said retainer member is formed with a skirt portion which is rigidly connected to the upper end of the lower housing member so as to encapsulate said one of said pair of insulation members within said cavity between said upper housing member and said retainer member.

11. The internal combustion engine of claim 10 wherein said lower housing member is conical in configuration.

12. The internal combustion engine of claim 11 wherein the other of said pair of insulation members is conical in configuration and is provided with a notch to accommodate a boss supporting a glow plug extending into the interior of said pre-combustion chamber.

13. A method of making a pre-combustion chamber an integral part of a cylinder head of an internal combustion engine, said pre-combustion chamber including a retainer member and an upper housing member and a lower housing member, a pair of independent and separate insulation members for reducing heat loss from said pre-combustion chamber, one of said insulation members having the form of a washer, and said upper housing member being formed with a collar which defines an opening for accommodating the nozzle of a fuel injector, said method comprising the steps of:

a. placing said one of said pair of insulation members on said upper housing member so as to surround said collar, b. placing said retainer member over said one of said insulation members so that said one of said insulation members surrounds said collar, c. securing said lower housing member to said retainer member so as to provide a unitary structure with said one of said insulation members encapsulated between said upper housing member and said retainer member, d. bonding said other of said pair of insulation members to the outer wall of said lower housing member so that said other of said pair of insulation members maintains a fixed position on said lower housing member, and e. casting said cylinder head around the assembled pre-combustion chamber and said insulation members so as to encapsulate said pre-combustion chamber and said insulation members within said cylinder head.

14. A method of making an insulated pre-combustion chamber to be located in a cylinder head of an internal combustion engine, said pre-combustion chamber including an upper housing member and a lower housing member and a retainer member, a pair of independent and separate insulation members for reducing heat loss from said pre-combustion chamber, and said upper housing member being formed with a collar defining an opening for accommodating the nozzle of a fuel injector, said method comprising the steps of:

a. placing said one of said pair of insulation members on said upper housing member so as to surround said collar, b. placing said retainer member over said one of said insulation members so that said one of said insulation members maintains its position on said upper housing member, c. securing said lower housing member to said retainer member so as to provide a unitary structure with said one of said insulation members encapsulated between said upper housing member and said retainer member, and d. positioning said other of said pair of insulation members around the outer wall of said lower housing member so that the assembled pre-combustion chamber can be incorporated in said cylinder head.

15. In an internal combustion engine having a cylinder and a piston disposed in said cylinder for reciprocal movement relative thereto, a cylinder head over said cylinder and piston to form a main combustion chamber, a pre-combustion chamber located in said cylinder head above said main combustion chamber, said cylinder head having an opening above said pre-combustion chamber for accommodating a fuel injector for feeding fuel into said pre-combustion chamber, said fuel injector having a nozzle holder provided with a leak-off hole intermediate the opposed ends of said nozzle holder, an injector holder secured to said cylinder head and having a cylindrical opening, said nozzle holder being located in said cylindrical opening in a fixed position relative to said injector holder, said injector holder being provided with three interconnecting passages for connecting said leak-off hole with a gallery passage leading to the fuel tank of the engine, one of said three passages being substantially aligned with the longitudinal center axis of said cylindrical opening and the remaining two passages being located along spaced axes which are substantially normal to the axis of said one of said three passages, and seal means between said nozzle holder and said cylindrical opening and between said injector holder and said cylinder head for sealing said two passages and for preventing leak-off fuel from gaining access to the cooling jacket of said engine.

16. The internal combustion engine of claim 15 wherein said pre-combustion chamber is located in a machined opening in said cylinder head.

17. The internal combustion engine of claim 16 wherein said pre-combustion chamber includes upper and lower housing members and a retainer member joined together as a rigid unitary assembly.

18. The internal combustion engine of claim 17 wherein a first insulation member is encapsulated between said retainer member and the upper housing member and a second insulation member surrounds said lower housing member.

19. The internal combustion engine of claim 18 wherein seal means are interposed between said retainer member and said machined opening in said cylinder head and second seal means are interposed between said retainer member and the lower end of said injector holder for preventing leakage of coolant from the cooling jacket chamber of said cylinder head into said main combustion chamber and into said machined opening.

20. In an internal combustion engine having a cylinder and a piston disposed in said cylinder for reciprocal movement relative thereto, a cylinder head over said cylinder and piston to form a main combustion chamber, a pre-combustion chamber located in said cylinder head above said main combustion chamber, said pre-combustion chamber including an upper housing member and a lower housing member and a retainer member all rigidly interconnected and being formed so as to provide an annular cavity between said retainer member and said upper housing member, said lower housing member having transfer passages formed therein connecting said pre-combustion chamber to said main combustion chamber and wherein said cavity serves as an insulation area and cooperates with a separate and independent insulation member located between said lower housing member and said cylinder head for reducing the heat loss from said pre-combustion chamber.

* * * * *